United States Patent [19]

Laakso

[11] 4,441,224

[45] Apr. 10, 1984

[54] METHOD OF CONTINUOUSLY TREATING A FIBROUS SUSPENSION

[76] Inventor: Oliver A. Laakso, Haralyn (West), #2 Middle Rd., Smith Parish, Bermuda, 3-18

[21] Appl. No.: 498,801

[22] Filed: May 27, 1983

Related U.S. Application Data

[62] Division of Ser. No. 374,763, May 4, 1982.

[51] Int. Cl.³ .............................................. D21D 1/40
[52] U.S. Cl. ...................................... 8/156; 68/181 R; 162/60; 162/251
[58] Field of Search ............ 210/456, 342, 334, 333.01, 210/412; 68/181 R; 162/60, 251; 8/156

[56] References Cited

U.S. PATENT DOCUMENTS

| | | | |
|---|---|---|---|
| 3,088,306 | 5/1963 | Richter | 68/181 R |
| 3,298,209 | 1/1967 | Laakso | 68/181 R |
| 3,312,352 | 4/1967 | Shiells | 210/456 X |
| 3,372,087 | 3/1968 | Richter | 162/251 |
| 3,524,551 | 8/1970 | Richter | 210/342 |
| 3,704,603 | 12/1972 | Richter | 68/181 R X |
| 3,815,386 | 6/1974 | Gullichsen et al. | 68/181 R |
| 3,905,766 | 9/1975 | Petterson | 8/156 |
| 4,172,037 | 10/1979 | Golston | 68/181 R X |
| 4,375,410 | 3/1983 | Richter et al. | 162/251 X |

Primary Examiner—Philip R. Coe
Attorney, Agent, or Firm—Cushman, Darby & Cushman

[57] ABSTRACT

A method and apparatus for effecting washing, bleaching, or thickening, etcetera of paper pulp or the like utilizes stationary screens, yet provides efficient treatment without significant screen clogging. Pulp introduced into the bottom of a cylindrical upright vessel is caused to flow in particular radial segments and channels. Introduction of pulp into all channels of a particular radial segment, extraction of withdrawn liquid from the radial segments, removal of treated pulp from the top of the vessel, and the introduction of treating liquid between the stationary screens, are coordinated so that uniform treatment of the upwardly flowing pulp results.

7 Claims, 18 Drawing Figures

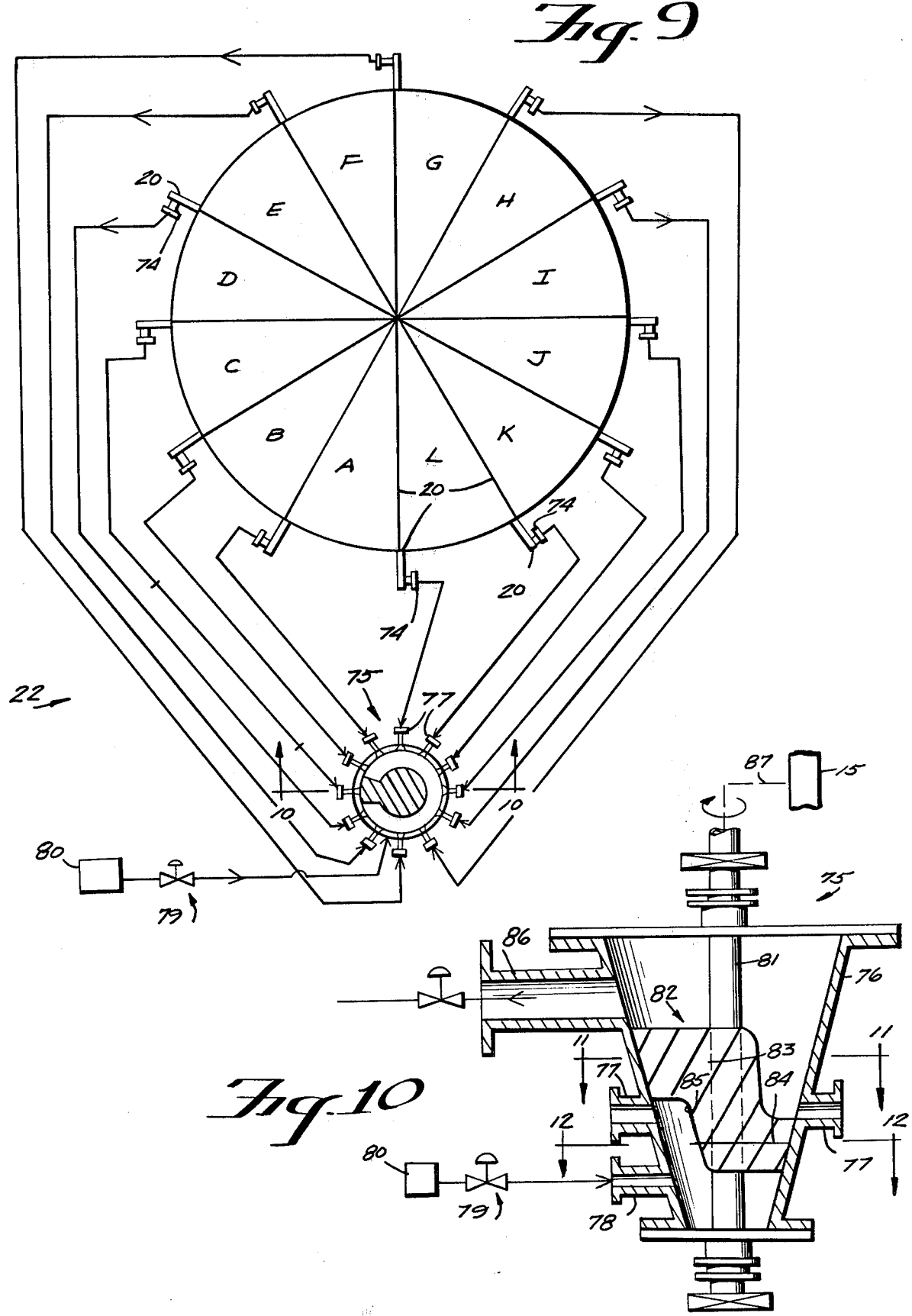

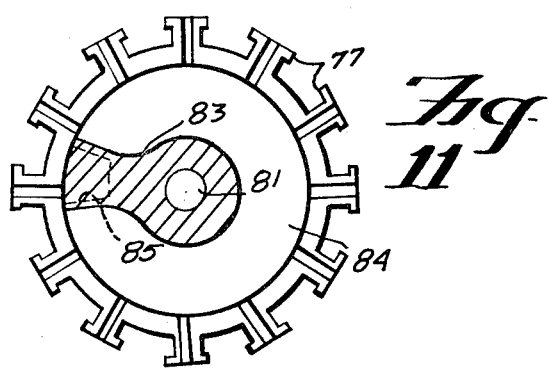
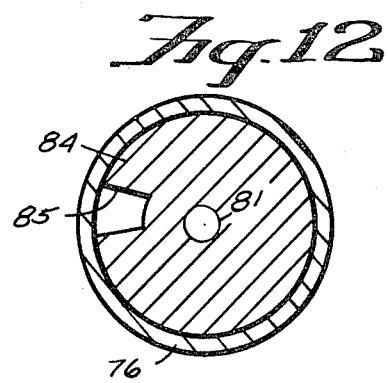
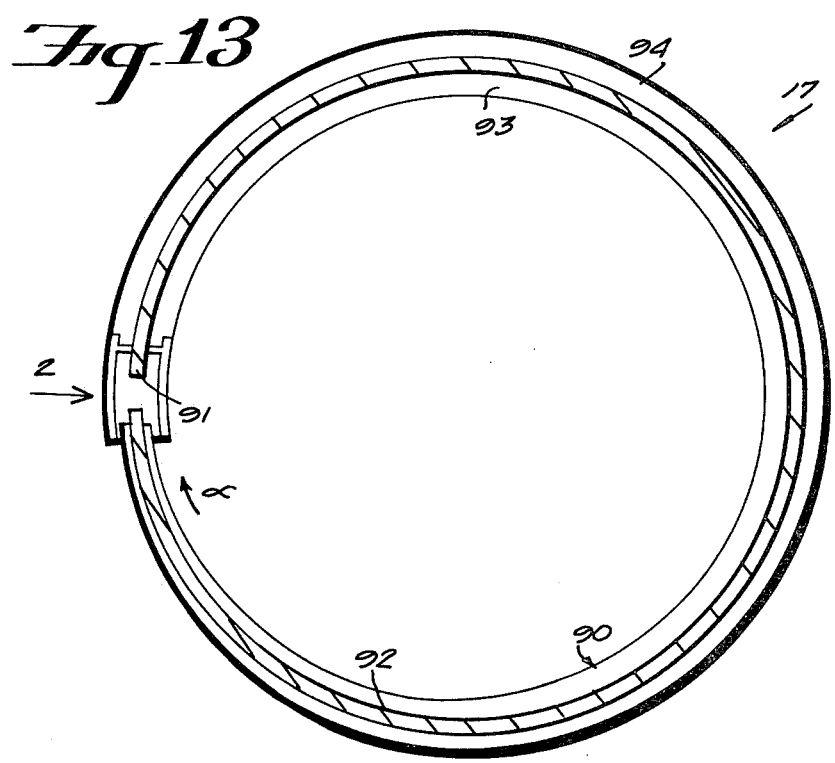

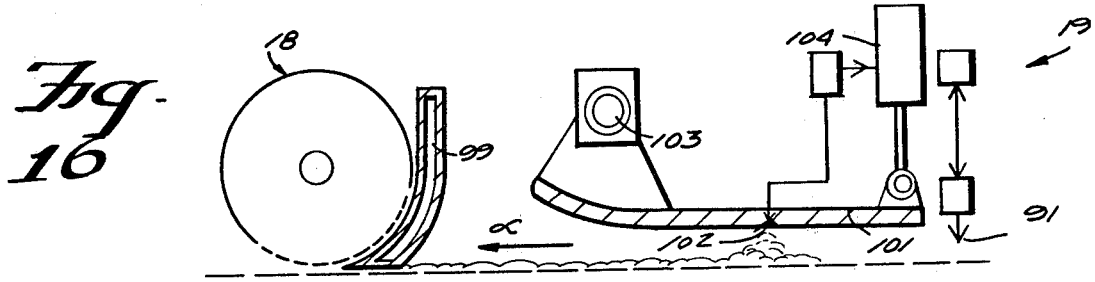
Fig. 16
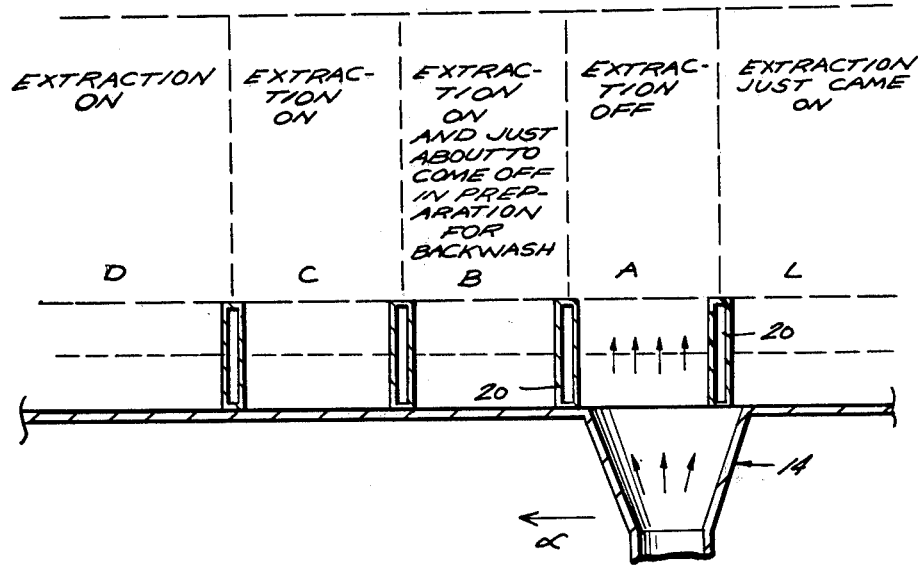
| EXTRACTION ON | EXTRACTION ON | EXTRACTION ON AND JUST ABOUT TO COME OFF IN PREPARATION FOR BACKWASH | EXTRACTION OFF | EXTRACTION JUST CAME ON |
|---|---|---|---|---|
| D | C | B | A | L |
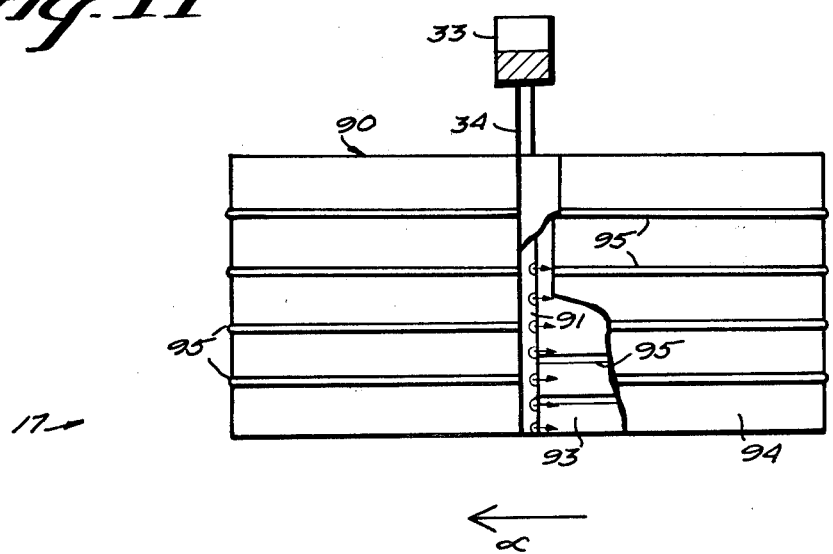
Fig. 14

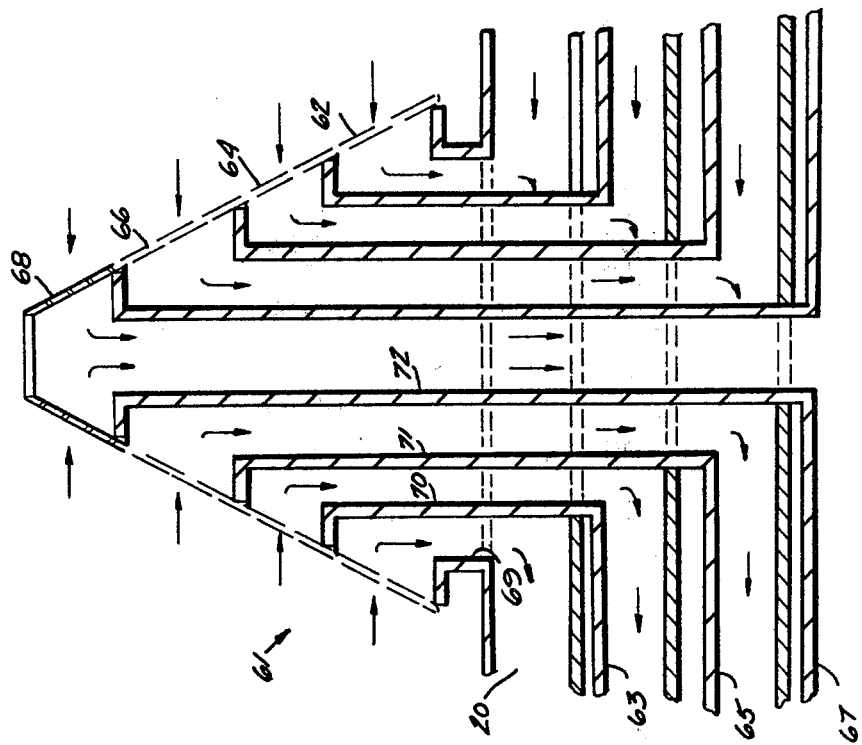
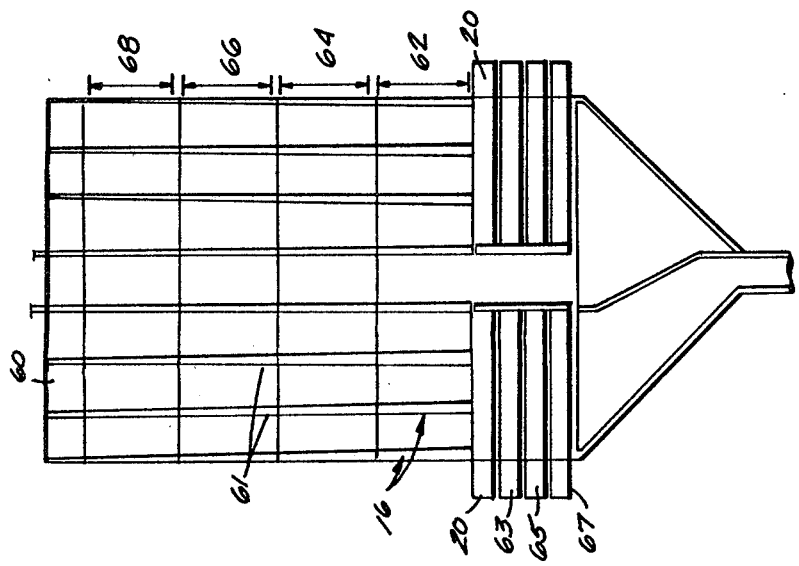

METHOD OF CONTINUOUSLY TREATING A FIBROUS SUSPENSION

This is a division, of application Ser. No. 374,763 filed May 4, 1982.

BACKGROUND AND SUMMARY OF THE INVENTION

The invention relates to a method primarily adapted for treating a comminuted cellulosic fibrous material with a treatment fluid. In particular, the invention primarily relates to diffusing wash water into a cellulosic pulp mass to displace liquid already in the mass to effect washing thereof.

In early stages of pulp treatment machinery development, diffusion was practiced by providing a plurality of screens located in the bottom of a tall cylindrical tank. Fresh wash water was added by a distribution system to the top of the pulp suspension, and the spent chemical solution was extracted from the tank under the screens being displaced by the fresh water diffusing downwardly by gravity through the pulp mass. Generally such diffusers were operated in series to increase the washing efficiency. Later, stationary pulp diffusers were replaced by rotary vacuum drum filters.

In modern times, the most commercially successful diffusers have operated on a continuous basis. In such modern diffuser designs the pulp mass is pumped upwardly through a tank passing inbetween a series of vertical concentric screens through which the spent liquor is extracted, wash water being introduced by generally tubular nozzles rotating in a concentric path between pairs of concentric screens. Attempts have been made to build such continuous diffusers with stationary extraction screens, however it was found that the screens had a tendency to clog rapidly, resulting in channeling of the pump and resultant low displacement efficiency. In order to overcome such clogging, the screens were made movable, and in commercial installations such screens are reciprocated, moving slowly upwardly at about the speed of pulp flow a given stroke length, and then moving rapidly downwardly (while extraction is shut off) to clean the screens. While such diffusers work very well and have enormous advantages over early stage technology diffuser machinery, the necessity for reciprocating the screens results in undesired complications and expense. Modern day attempts to overcome such disadvantages, such as by providing stationary screens and introducing gas within the screens to prevent clogging, have not met with commercial acceptance.

According to the present invention, a method is provided for the continuous treatment of a fibrous suspension, such as a suspension of comminuted cellulosic fibrous material, which overcomes drawbacks associated with conventional commercially utilized treatment apparatus, while maintaining the advantages thereof. According to the present invention, stationary screens are successfully utilized to effect uniform treatment of the fibrous material; despite the fact that stationary screens are utilized in a continuous treatment of a fibrous suspension, no significant screen clogging—which would result in non-uniform treatment—occurs.

According to one aspect of the present invention, a method of continuously treating a suspension of comminuted cellulosic fibrous material is provided. While the invention is primarily directed to the diffusion washing or bleaching of paper pulp having a consistency of about 6 to 14%, the general principals of the invention are applicable to a variety of other treatment procedures, types of suspensions, and suspension consistencies. For instance the invention is applicable to the thickening of pulp.

An exemplary method of continuously treating a suspension according to the invention utilizes a cylindrical vessel with stationary screens and movable treatment-fluid introduction structures. The method comprises the following steps: (a) Defining a plurality of radial segments, and a plurality of vertical channels in each radial segment, in the vessel. (b) Introducing the suspension, adjacent the vessel bottom upwardly in the vessel in a moving suspension column, into a cross-sectional area in the vessel corresponding to that of approximately one of the radial segments. (c) Introducing treatment liquid with the movable fluid introducing structures so that shock waves acting on the stationary screens as a result of the fluid introduction are minimized. (d) Substantially continuously removing withdrawn fluid from the majority of the stationary screens' area. (e) Terminating extraction from the screens in each radial segment approximately when the suspension is being introduced therein; and (f) Continuously removing from a top portion of the vessel, above the level of the screens, a portion of the entire radial extent of the suspension at the of the top of the column preceding the radial segment into which the suspension is being introduced at the bottom of the column. The further step of (g) controlling the ratio of the upward flow of suspension in each of the vertical channels so that the flow in each channel is substantially the same as the flow in the other channels, is also preferably practiced.

In general, treatment of the suspension, according to the invention, is accomplished by deliberately promoting channeling in a vessel including stationary screen assemblies, and coordinating the suspension introduction, the suspension flow, the suspension removal, the displaced-liquid extraction, and the treatment liquid introduction so that clogging will not occur, and a uniform treatment of the fiber passing through the vessel results.

The preferred apparatus for practicing the method of the present invention includes many novel components, and a synchronization of these components to effect the desired uniform treatment of fiber while maintaining the screens stationary. Preferably, the stationary screens are mounted on a plurality of radially extending extraction arms, the extraction arms defining a plurality of radial segments. The screens preferably include a plurality of annular, concentric, screen assemblies, and the fluid introducing structure comprises a generally annular nozzle assembly disposed between each set of screens, and rotatable with respect to the screens. The screens and nozzle assemblies define a plurality of vertical channels. Upward movement of the suspension is controlled by the segments and channels. While in the ensuing disclosure an exemplary predetermined number of radial segments and vertical channels (i.e. 12 radial segments and 6 vertical channels) will be disclosed, it is to be understood that virtually any number of segments or channels could be provided depending upon the material being treated, the flow rate desired, the diffusion efficiency required, etc. (e.g. 3–48 radial segments and 2–12 vertical channels).

Suspension is introduced into the bottom of the vessel by a rotating pulp inlet structure which has the cross-sectional shape and area of approximately one radial segment. The pulp inlet is connected to a rotating shaft which is centrally located in the vessel, the shaft also being connected to a suspension withdrawal structure, the treatment-liquid introducing nozzle assemblies, and a structure for controlling the ratio of upward flow of suspension in each vertical channel of a radial segment.

The stationary screens are constructed so that they present a minimum resistance to the upward flow of suspension, having the cross-sectional area of a right circular cone frustum, and having the liquid inlet openings in the screen face slanted downwardly. A plurality of screen segments can be stacked upon each other to provide multiple stages, each stacked assembly having the cross-sectional configuration of the frustum of a right circular cone, and including interior passageways connecting each screen of each stage to a different extraction arm. All screen segments within a given radial segment of the vessel are hydraulically connected to the same, single, extraction arm.

The construction of the nozzle assembly according to the present invention is designed to minimize the shock waves acting upon the screens as a result of nozzle movement. The nozzle design—while particularly adapted for use with the stationary-screen apparatus according to the invention—also is applicable to conventional continuous diffusers, such as shown in U.S. Pat. No. 3,524,551. The nozzle assembly includes a vertically extending generally linear nozzle with fluid-introducing openings formed therein, and an annular wall structure concentric with the vessel and annular screens, and having an increasing cross-sectional area from a point immediately following the fluid introducing structure in the direction of rotation of the nozzle to a point of connection of the annular wall structure to the nozzle. The cross-sectional area of the wall structure is such that at any point in the rotation cycle of the nozzle assembly the volume of introduced liquid plus the nozzle volume is a constant. The nozzle may be readily constructed by providing a metal ring as an interior component, and placing a polytetrafluoroethylene ring of continuously varying thickness along each face of the metal ring. The polytetrafluoroethylene exterior surfaces can be formed with circumferential ribs to maintain uniform liquid distribution to minimize resistance.

The suspension withdrawal structure located above the screens comprises a screw conveyor assembly, or like structure, capable of removing an entire vessel radius of material at the same time. This is in contradistinction to prior art removal scrapers, such as shown in U.S. Pat. No. 3,905,766, which move each portion of suspension arcuately as well as radially during each rotation. The screw conveyor assembly includes a rotating screw, which is rotatable about an axis extending along a radius of the vessel, the screw conveyor assembly being rotatable with the central shaft.

Following the screw conveyor assembly in the direction of rotation of the shaft is a means for equalizing the flow rate within the vertical channels of a radial segment or segments over which the conveyor assembly has passed. Such a structure preferably comprises a plate mounted for rotation about a generally horizontal axis, with a force applied thereto a pneumatic or hydraulic cylinder or the like. A plurality of pressure sensors located on the bottom of the plate, one associated with each vertical channel within a radial segment, control the force application provided by the cylinder. The entire assembly is rotatable with the shaft.

Extraction of displaced liquid from each of the extraction arms is controlled by a valve assembly so that extraction continuously takes place from each extraction arm (and screen segments associated therewith) except for the approximate time period during which suspension is being introduced into the radial segment associated with that extraction arm. During at least a portion of the time when the extraction is off, back-washing liquid is introduced into the extraction arm and associated screen segments in order to relieve the pulp from the screen surfaces. A single rotary valve, rotated in synchronization with the central shaft of the vessel, may be provided to effect extraction and back-washing.

By properly positioning the suspension introducing structure, nozzle fluid inlets, suspension withdrawal structure, and channel flow-control structure on the central rotating shaft, and synchronizing the rotation of that shaft with the extraction-back-wash valve, it is possible to efficiently and uniformly treat the fibrous cellulosic material passing past the stationary screens, with minimum potential for screen clogging.

It is the primary object of the present invention to provide a simple and effective method (and component parts thereof) for the continuous treatment of a suspension with a treatment fluid. The invention is particularly applicable to the treatment of pulp suspensions having a consistency of about 6–14%. This and other objects of the invention will become clear from an inspection of the detailed description of the invention, and from the appended claims.

BRIEF DESCRIPTION OF THE DRAWINGS

FIG. 9 is a top diagrammatic view of a means for providing extraction and back-wash, alternative to the embodiment of FIG. 8;

FIG. 10 is a cross-sectional view taken along lines 10—10 of FIG. 9 illustrating a preferred valve structure utilized in the system of FIG. 9;

FIG. 11 is a cross-sectional view taken along lines 11—11 of FIG. 10;

FIG. 12 is a cross-sectional view taken along lines 12—12 of FIG. 10;

FIG. 13 is a top plan view of an exemplary nozzle assembly according to the present invention;

FIG. 14 is a side view of the nozzle assembly of FIG. 13 as viewed in the direction of arrow Z, with portions cut away for clarity;

FIG. 16 is a diagrammatic showing of a linear development of key portions of the structure of FIGS. 1 and 15, showing the synchronous operational cooperation therebetween;

FIG. 17 is a side cross-sectional view of exemplary multi-stage screens that may be utilized in practicing the invention; and FIG. 18 is a diagrammatic detail cross-sectional view of an exemplary screen stack of FIG. 17, with relative dimensions of the components distorted for clarity of illustration.

DETAILED DESCRIPTION OF THE DRAWINGS

Figure 1:
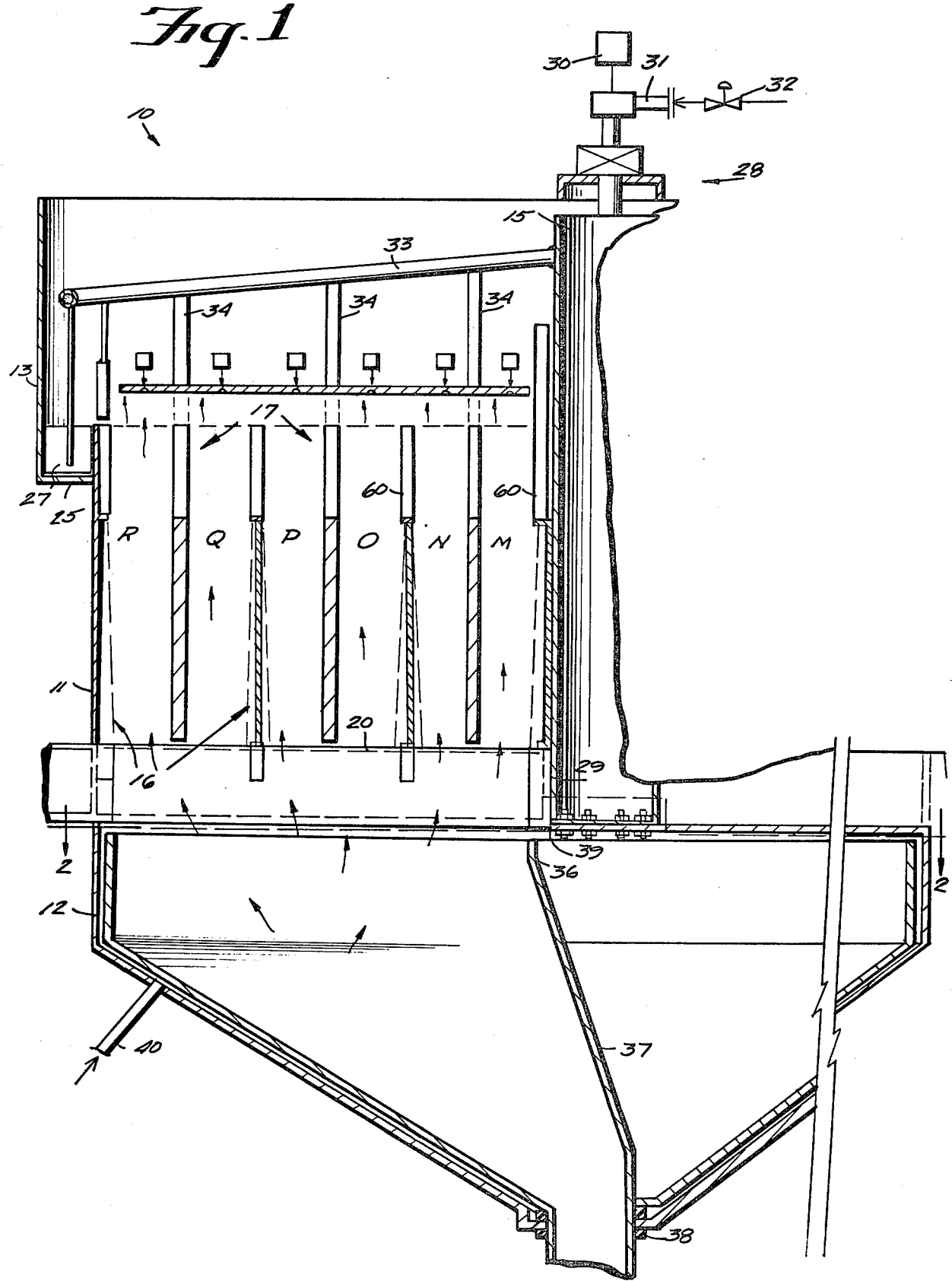
FIG. 1 is a side cross-sectional view, with portions cut away for simplicity of illustration, of an exemplary diffusion apparatus according to the present invention.

Exemplary apparatus for treating a suspension, particularly a suspension of comminuted cellulosic fibrous material having a consistency of about 6–14%, according to the present invention is shown generally by reference numeral 10 in the drawings. Major components of the apparatus 10 are: A cylindrical generally upright vessel 11, having a bottom portion 12 into which the suspension to be treated is passed, and a top portion 13 from which treated suspension is withdrawn. A pulp inlet structure 14 rotatable in the bottom portion 12 of the vessel 11 for introducing the suspension to be treated, and operatively connected to a central rotating shaft 15, the shaft 15 disposed along the vertical axis of the vessel 11. A plurality of annular stationary screens 16, concentric with the shaft 15. A plurality of treatment-fluid introduction structures 17, operatively connected to central shaft 15. A treated-suspension removal structure 18 (see FIG. 15 in particular). A channel-flow ratio equalizing structure 19 (see FIG. 15 in particular). And, a plurality of radially extending extraction arms 20, and associated valve means 21 or 22 (see FIGS. 8 and 9 respectively), for controlling the extraction and supply of back-wash liquid thereto.

According to the invention, the vessel 11 is divided up into a plurality of radial segments and a plurality of vertical channels (see segments A-L in FIGS. 8 and 9, and vertical channel M-R in FIG. 1), the segments and channels facilitating provision of a controlled channeling of suspension to be treated in the vessel 11. By controlling and coordinating the extraction of liquid through screens 16, arms 20, and valve means 21 or 22; the provision of back-wash liquid through valve means 21, 22; the introduction of suspension by pulp inlet 14 at predetermined radial segments; the introduction of treatment fluid with fluid introduction structure 17; the removal of all treated suspension along a particular radius of vessel 11 by the removal means 18; and the equalization of flow ratio within the channels M-R by the structure 19; uniform treatment of the pulp with minimum potential for screen clogging, and without the necessity for moving the screens, ensues.

At the top portion of the vessel 13, a conventional pulp launder 25 with a pulp discharge 26 (see FIG. 15) may be provided, conventional scrapers 27 in the launderer 25 moving the pulp to the discharge 26. Suitable bearing means 28 (see FIG. 1) are provided for mounting the central shaft 15 at the top of the vessel 11 for rotation about the central axis of the vessel, and further bearing means, illustrated diagrammatically by reference numeral 29 in FIG. 1, may be provided adjacent the bottom portion 12 of the vessel. A suitable conventional power structure 30 rotates the shaft 15 in the direction (see FIGS. 13 and 15). The shaft 15 may be hollow, and treatment liquid may be introduced therein through conduit 31, controlled by valve 32, for ultimate distribution to the fluid introduction structure 17 through hollow support arms 33 and vertical conduits 34. The manner of fluid supply may be much the same as in conventional commercial diffusion washers, such as shown in U.S. Pat. No. 3,372,087.

Figure 2:
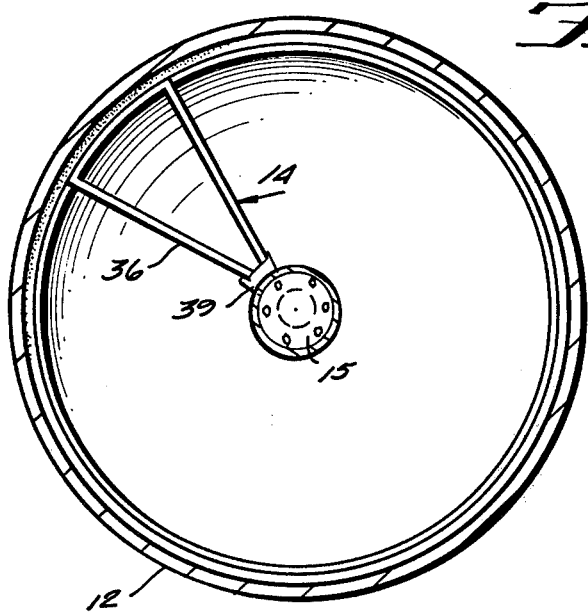
FIG. 2 is a cross-sectional view of the apparatus of FIG. 1 taken along lines 2—2 thereof.

The pulp introduction structure 14 is illustrated most clearly in FIGS. 1 and 2, and comprises a substantially pie-shaped upper portion 36, having a cross-sectional area and shape approximately the same as that of one of the radial segmets A-L. A conduit 37 extends downwardly from the upper portion 36, and is mounted in a polytetrafluoroethylene sleeve 38 or the like for rotation with respect to the bottom portion 12 of the vessel 11. A plate 39 integral with the top portion 36 is bolted, or otherwise attached, to the central shaft 15, as illustrated in FIG. 1. A purge liquid can be introduced between housing 12 and conduit 37 at 40 (see FIG. 1).

Figure 7:
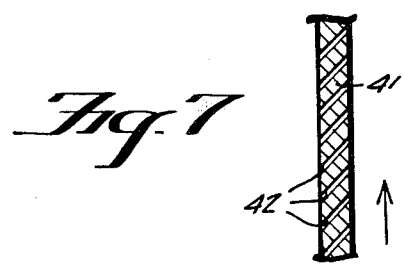
FIG. 7 is an enlarged detail cross-sectional view of a portion of a preferred screen surface of the device of FIG. 1.

The annular stationary screens 16 each include at least one screen surface 41 (see FIGS. 3, 5, and 7 in particular) which may be slotted, apertured, or otherwise constructed in a conventional manner, to allow liquid passage therethrough. Preferably, however, in order to minimize resistance to suspension upward flow in the vessel 11, each screen surface 41 is provided with a plurality of downwardly slanting fluid-passage openings, as illustrated by reference numerals 42 in FIG. 7. An interior supporting structure 43 preferably is provided for the screen surfaces 41, and in order to further minimize resistance to pulp flow, it is preferred that the screen surfaces 41 are slanted with respect to the vertical. That is, each screen surface 41 is provided so that at its top it is closer to the interior supporting structure 43 (which is essentially vertical) associated therewith than it is at the bottom (see FIGS. 1 and 3 in particular). Thus the screen structures 16 spaced from the shaft 15 and the side wall of vessel 11 have the cross-sectional area of a right-circular cone frustum.

Figure 6:
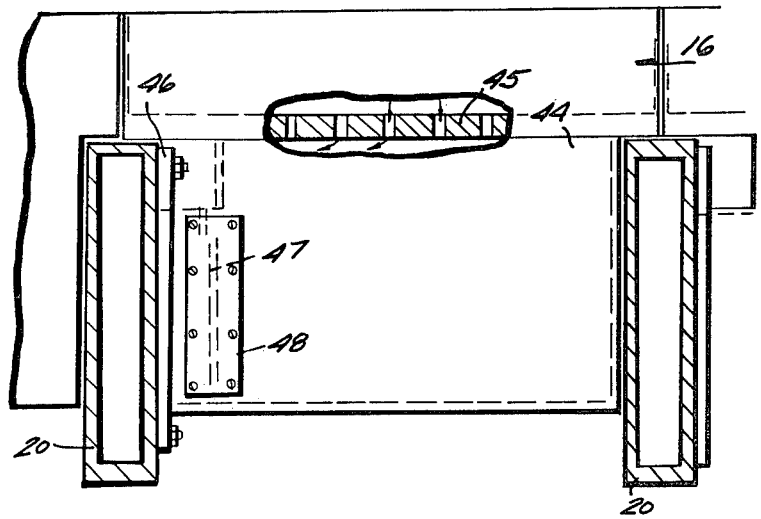
FIG. 6 is a detail cross-sectional view taken along lines 6—6 of FIG. 5.
Figure 5:
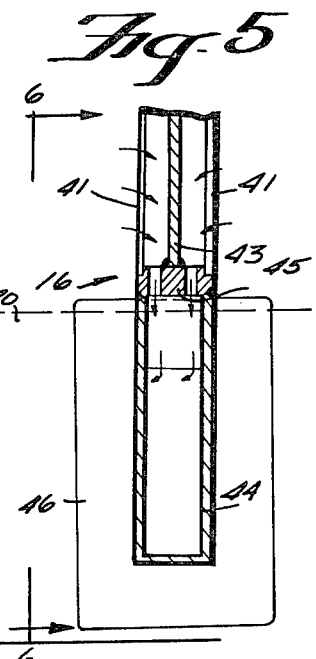
FIG. 5 is a detail cross-sectional view illustrating an exemplary connection between a screen ring and extraction arm in the device of FIG. 1.
Figure 8:
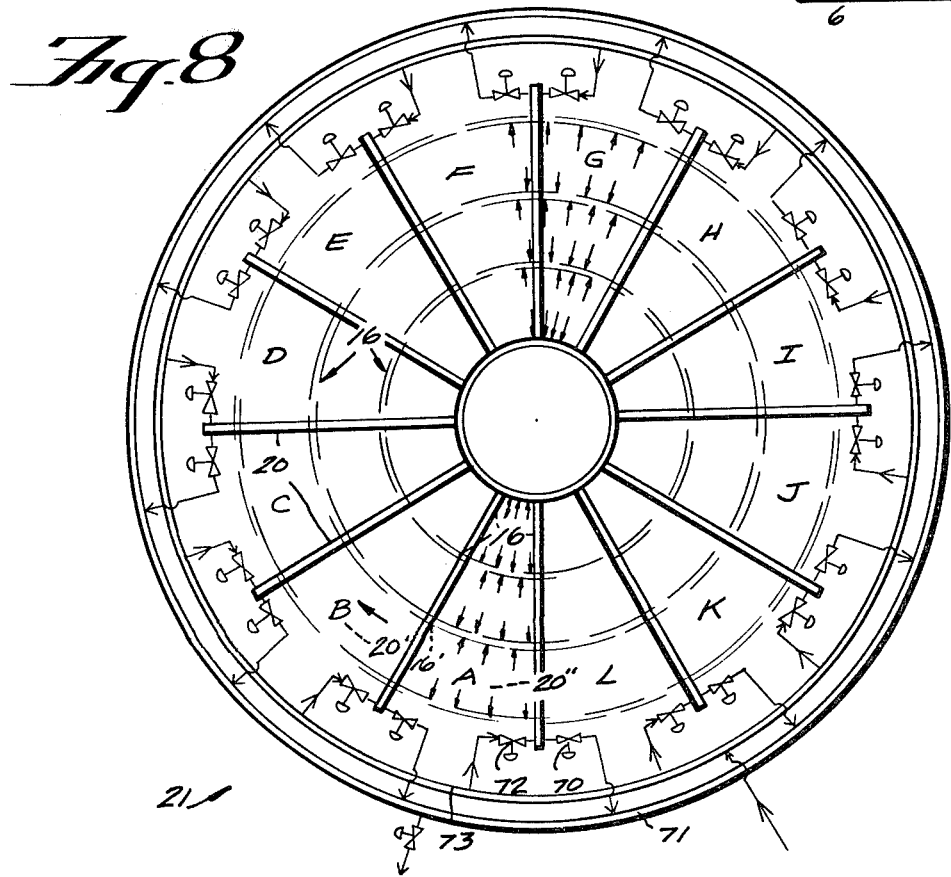
FIG. 8 is a top plan diagrammatic view illustrating an exemplary form of the interconnections between the extraction arms, an extraction control assembly, and a back-wash liquid control assembly.

Each arcuate section of the screen structure 16 associated with each of the radial segments A-L is connected to the same radial extraction arm 20, and only that arm 20. An exemplary manner of interconnection between a screen structure 16 and an arm 20 is illustrated in FIGS. 5 and 6, a header 44 being connected to the interior of its respective screen structure 16 by an apertured plate 45 connected to interior supporting structure 43, and a radial extraction arm 20 being connected by a bolted flange 46 to the header 44, hydraulic connection being provided through an orifice plate 47 or the like (see FIG. 6), with a cover plate 48 or the like allowing access thereto. With particular reference to FIG. 8, each of the screen structures 16' in radial segment A is connected hydraulically to the radial extraction arm 20', and physically connected to both the extraction arm 20' and extraction arm 20''.

The arms 20 can be built as indvidual shop-fabricated units, and field assembled to form a complete screen and extraction arm assembly.

Figure 3:
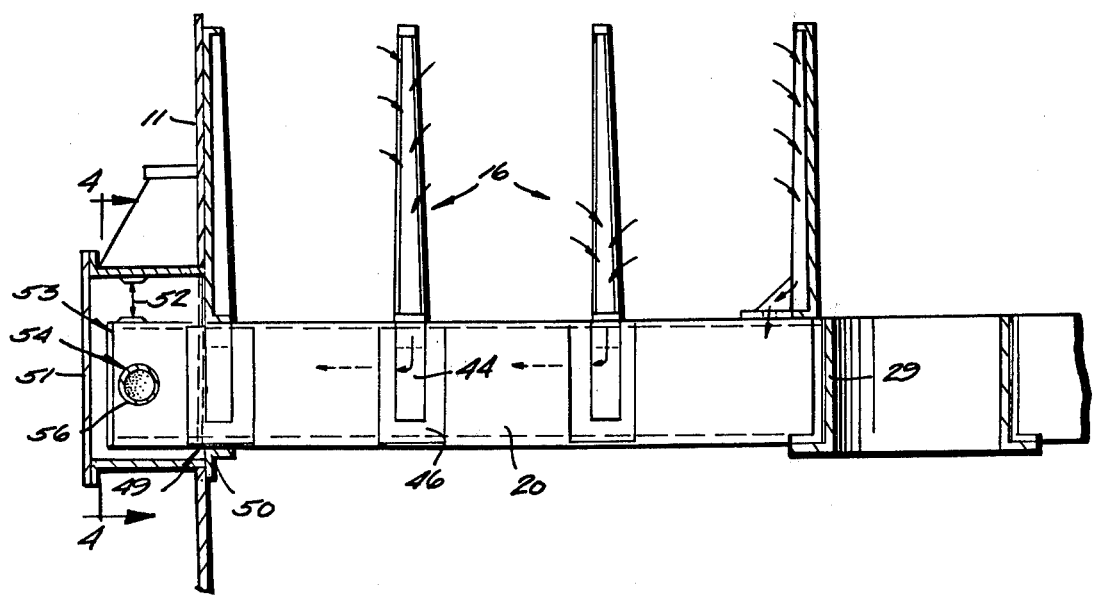
FIG. 3 is a detail side view, partly in cross-section and partly in elevation, indicating the interconnection between the screen extraction arms, and vessel, of the apparatus of FIG. 1.
Figure 4:
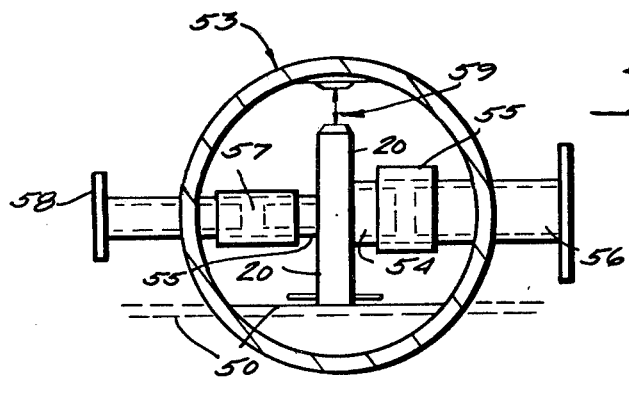
FIG. 4 is a detail cross-sectional view of a portion of the apparatus of FIG. 3 taken along lines 4—4 thereof.

An exemplary manner of connection of an exemplary extraction arm 20 to the vessel 11 to provide for withdrawal of extracted liquid, and introduction of back-wash liquid, is illustrated in FIGS. 3 and 4. Each arm 20 passes through an opening 49 in the side wall of the vessel 11, a machined and leveled support ring 50 being provided for supporting all of the arms 20 at their points of passage through the openings 49. Shims may be provided as required between the support ring 50 and the arms 20. Each arm 20 terminates in an annular housing 51 exterior of the side walls of vessel 11, with an arm leveling screw or the like preferably being provided, as indicated by reference numeral 52 in FIG. 3, between the top of housing 51 and the end portion 53 of arm 20 to insure appropriate positioning of the arm 20. The bottom bearing 29 for the shaft 15 may also comprise a central locater ring for the arms 20, as illustrated in FIG. 3.

As seen most clearly in FIG. 4, the end termination 53 of each extraction arm 20 is preferably circular in cross-section and includes two interior conduits 54, 55, conduit 54 connected by a flexible connector 55 to a connection 56 which ultimately passes to an extraction header, and conduit 55 connected through a flexible connector 57 to a connection 58 which is connected to a back-wash liquid supply. The position of the arm 20 with respect to the end termination 53 also may be appropriately adjusted by a leveling screw indicated generally by reference numeral 59 in FIG. 4.

A blank filler piece 60 (see FIG. 1) may be provided at the top of each of the screen structures 16. Additionally, each structure 16 may comprise a number of stages, as illustrated in FIGS. 17 and 18 wherein four screen stages are provided associated with each structure 16. Each entire multi-stage screen assembly 61 has the cross-sectional configuration of a right circular cone frustum, and a separate extraction arm is provided for connection to each stage of the multi-stage screen 61. For instance arms 20 are connected to the first stage screens 62, arms 63 are connected to the second stage 64, arms 65 are connected to the third stage 66, and arms 67 are connected to the fourth stage 68. This connection is provided by interior concentric conduits 69, 70, 71, and 72 (which may be annular or tubular), as illustrated in FIG. 18.

Withdrawal of extracted liquid from the arms 20 is provided by valve means, to synchronize the extraction of liquid from each radial segment of screens with respect to the position of pulp inlet 14. One manner of providing such valve means is illustrated in FIG. 8 wherein valve means 21 are provided, comprising a solenoid operated valve 70 being connected between each extraction connection 56 and an extraction header 71, and a solenoid operated valve 72 being connected between each back-wash liquid connection 58 and back-wash header 73. A central controller (not shown) controls the extraction and back-wash introduction so that for the radial segment in direct communication with the pulp inlet 14 (segment A in diagrammatic FIG. 16) the extraction is off (e.g. about 2 seconds), and back-wash liquid is introduced into all the arcuate screen segments of the screen structures 16 within that radial segment (i.e. A) for at least part of the time that the extraction is off.

An alternative, simplified valve means 22, is illustrated in FIGS. 9 through 12. In this arrangement, only one conduit 74 need be provided in operative association with each extraction arm 20, and a central common valve structure 75 is provided. The common valve structure 75 includes a hollow housing 76 having a plurality of radially extending fluid connections 77, one associated with each extraction arm 74, and a single back-wash introduction nozzle 78 axially spaced from the connection 77. A valve 79 (normally open) controls the flow of back-wash liquid from a source 80 to the conduit 78.

A central shaft 81 is provided in housing 76, disposed along the central axis thereof, and has a valve member 82. The valve member 82 comprises an upper segment 83 which has a blocking structure having an arcuate extent approximately the same as the arcuate spacing between a pair of adjacent connections 77 (see FIG. 11), and having a bottom portion 84 comprising means defining a passageway 85 which is in alignment with the blocking portion of the first valve member portion 83, and having an arcuate extent only slightly less than the arcuate extent of the blocking portion of upper valve portion 83. An extraction liquid outlet 86 is in communication with the interior of housing 76 on the opposite sides thereof as the back-wash conduit 78, extracted liquid passing through connection 77 into housing 76 being withdrawn through the conduit 86. The rotation of shaft 81 is coincident with the rotation of shaft 15, and in fact a mechanical connection therebetween can be provided, as indicated by dotted line 87 in FIG. 10.

An exemplary nozzle assembly according to the present invention is best seen in FIGS. 1, 13, and 14. Conventional nozzles in commercial continuous diffusers normally are merely tubes with a tapered leading edge. Such nozzles when passing through the pulp mass create shock waves which are transmitted to the screens. These shock waves—it has been found according to the present invention—can be a substantial source of screen blockage. The fluid introduction structures 17 according to the present invention overcome these problems by greatly minimizing (or eliminating) the shock waves transmitted as a result of nozzle rotation. The structures 17 according to the present invention are preferbly utilized in the apparatus 10 according to the invention, although they also may be utilized in conventional commercial diffusion washers, such as shown in U.S. Pat. No. 3,372,087.

The fluid introduction structures 17 according to the present invention are constructed so that at any point in the rotation cycle thereof the volume of treatment liquid plus the nozzle assembly volume is substantially a constant. At the point in the rotation cycle where the liquid has just been added, the liquid volume is great, whereas the point in the pulp mass immediately before the rotating liquid introduction point the liquid volume is small. This can be accomplished by construction of surface means comprising a substantially annular wall structure 90 operatively connected to an axially extending linear liquid introducing portion 91, the wall structure 90 having an increasing cross-sectional area from a point immediately following the liquid introduction portion 91 to the point of conneciton of the treatment-liquid introducing portion 91 to the wall structure 90, as illustrated most clearly in FIG. 13.

The wall structure 90 preferably is constructed by providing an annular metal wall 92 having a constant width, and constructing a pair of tapered-width thermoplastic sheets having the same height as the metal wall 92, and having a length approximately the same as the circumference (one interior, one exterior) of the metal wall 92. A particularly suitable thermoplastic material for the sheets is polytetrafluoroethylene in view of its low-friction properties. One polytetrafluoroethylene sheet, 93 in FIG. 13, is disposed along the interior circumference of the metal wall 92, while another polytetrafluoroethylene sheet 94 is disposed along the exterior circumference, the sheets 93, 94 being connected to the metal annular wall 92 in any suitable manner. In order to improve flow distribution of introduced liquors, the exterior surfaces of the now-annular structures 93, 94 can be circumferentially ribbed as illustrated by thin ribs 95 in FIG. 14. Treatment liquid is supplied to the liquid-introducing portion 91 of each nozzle assembly 17 by structures 33, 34 (see FIG. 1).

At the top portion 13 of vessel 11, the treated-pulp removal structure 18 is provided. This structure is seen most clearly in FIGS. 15 and 16, and comprises a structure for removing an entire radius of pulp at the top of the vessel 11, as opposed to merely gradually moving portions of pulp arcuately as well as radially outwardly as is done by conventional scrapers such as shown in U.S. Pat. No. 3,905,766. One preferred form the removing means 18 may take is a screw conveyor assembly, including a screw 97 having a central shaft 98 disposed along a radius of the vessel 11, and rotatable about that axis by any conventional powered rotating means (not shown). A collecting trough-blade structure 99 follows the shaft 98 in the direction of rotation (see FIG. 16 in particular). The entire structure 18 is connected to the central shaft 15 in any suitable manner for rotation therewith. Pulp removed by the screw 97 is deposited in launderer 25, and ultimately discharged in pulp discharge 26 by paddles 27.

Figure 15:
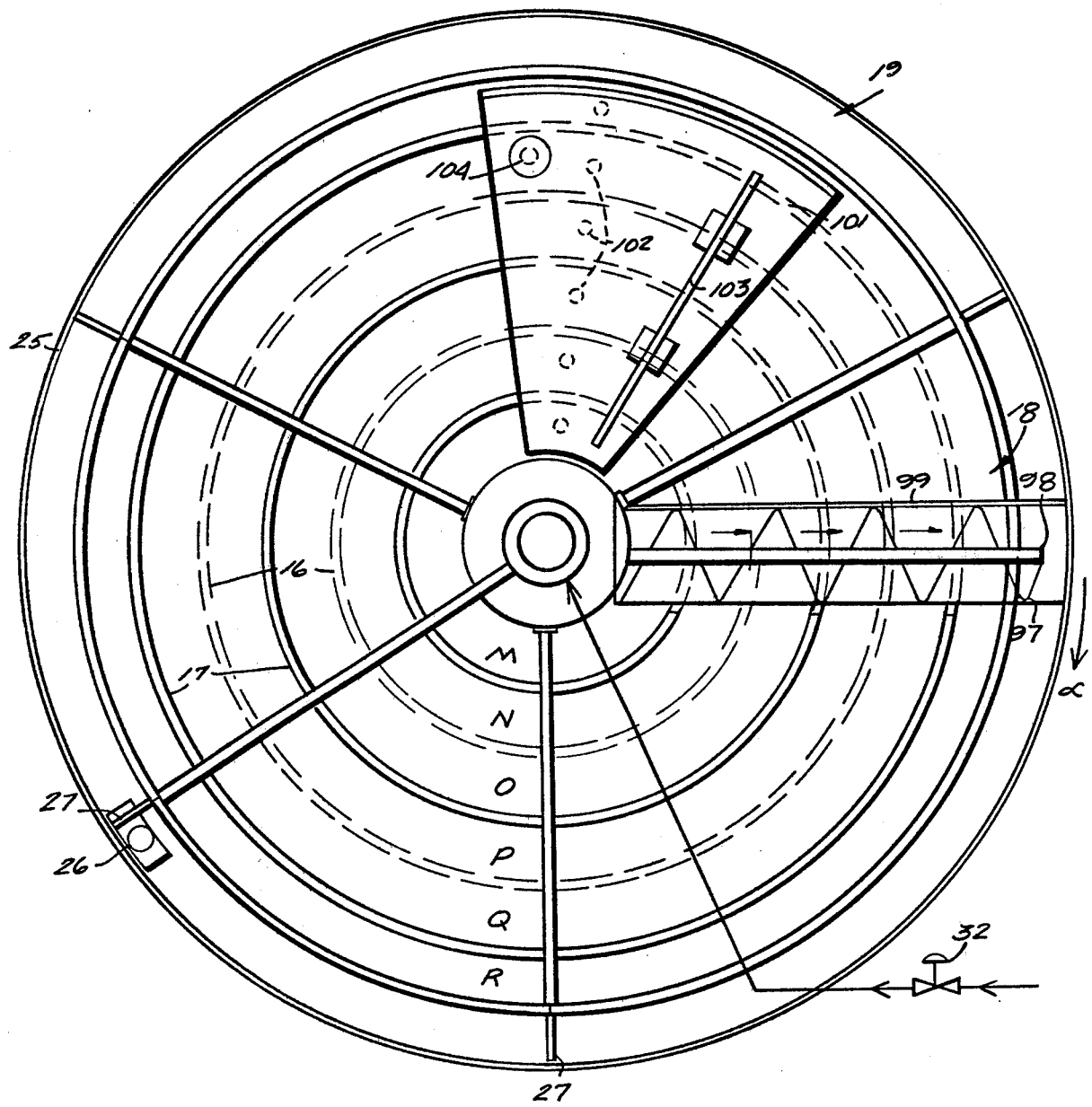
FIG. 15 is a top plan view of the structure of FIG. 1.

The means 19 for equalizing the upward flow rate of pulp in each channel M through R, particularly for one of more radial segments A-L, may take the form illustrated in FIGS. 15 and 16. The means 19 in this form comprises a plate 101 having a pie-shape, and having the dimensions of at least one radial segment A-L (shown having dimensions of approximately 1 and ½ radial segments A-L in the embodiment illustrated in the drawings). A plurality of conventional pressure sensors 102, one associated with each vertical channel M-R, are disposed on the bottom of plate 101, and the plate is mounted for rotation with the shaft 15, and for pivotal movement about a horizontal axis defined by shaft 103 (see FIG. 16). A force supplying means, such as a pneumatic or hydraulic cylinder 104, also mounted for rotation with the shaft 15 supplies a downwardly directed force to a portion of the plate 101 circumferentially spaced from the shaft 103, the force applied by the cylinder 104 being responsive to the pressure sensors 102. The structure 19 thus provides sufficient back pressure on the pulp in the radial segment into which pulp is being introduced (e.g. A in FIG. 16) to insure that the pulp in each channel M-R is brought to a uniform level. Note that the structure 19 is not a flow controller, merely a flow equalizer, the flow rate of the pulp being determined by the flow rate through inlet 14 into the vessel 11.

If necessary, the entire structure 19 can be designed so that it will rise under upset conditions so that structural damage thereto will be avoided.

Exemplary structures according to the invention having been described, a typical manner of operation thereof will now be described with respect to FIG. 16, which is a linear development of a portion of the vessel 11, and clearly illustrates the synchronization of the various operative components to provide the desired pulp treatment without screen clogging.

In FIG. 16, the pulp is shown being introduced through structure 14 into radial segment A. The position of the valve member 82 of the common valve structure 75 is synchronized with respect to the pulp inlet structure 14 so that the upper portion 83 of the valve member 82 blocks off the extraction flow from the extraction arm 20 associated with radial segment A, and during a portion of the time of this block-off back-wash liquid flows through connection 78, passageway 85, and connection 77 associated with segment A to back-wash all segments of the screen structures 16 associated with segment A. The channel flow rate equalizing structure 19 is positioned, vis-a-vis the pulp inlet 14, so that the pressure sensors 102 are above each vertical channel M-R of the radial segment A, and thus the flow rate in the vertical channels is equalized. The treated-pulp removal means has just passed over the segment A (and now is approximately two segments further on) and has removed all the pulp in the radial segment A so that further introduction thereinto, under controlled conditions, is possible. The common valve structure 75 has also controlled the extraction for the other radial segments so that the extraction in segment L, just preceding segment A in the direction of rotation, just came on, and the extraction in segment B is about to come off, and back-wash liquid is about to be introduced thereinto. Treatment liquid is introduced by structure 91 at about radial segment L, the segment that has just been re-filled with pulp and where the extraction has just been turned on.

It will thus be seen that according to the present invention a method and apparatus (and component parts thereof) have been provided which effect the uniform, efficient treatment of suspensions utilizing stationary screens. While the invention has been primarily described with respect to the treatment of pulp suspensions having a consistency of about 6–14%, a wide variety of other suspensions also may be treated according to the present invention. Also, while the invention has been primarily described with respect to washing, by the introduction of wash water, the invention is also applicable to other processes, such as diffusion bleaching, and thickening.

While the invention has been herein shown and described in what is presently conceived to be the most practical and preferred embodiment thereof, it will be apparent to those of ordinary skill in the art that many modifications may be made thereof within the scope of the invention, which scope is to be accorded the broadest interpretation of the appended claims so as to encompass all equivalent structures, methods, and devices.

What is claimed is:

1. A method of continuously treating a suspension of comminuted cellulosic fibrous material in a cylindrical vessel utilizing stationary screens and movable treatment-fluid introduction structures and minimizing the potential for screen clogging, comprising the steps of continuously:
   (a) defining a plurality of radial segments, and a plurality of vertical channels in each radial segment, in the vessel;
   (b) introducing the suspension, adjacent the vessel bottom to flow upwardly in the vessel in a moving suspension column, into a cross-sectional area in the vessel corresponding to that of approximately one of the radial segments;
   (c) introducing treatment liquid with the movable fluid introducing structures so that shock waves acting on the stationary screens as a result of liquid introduction are minimized;

(d) substantially continuously withdrawing liquid from the majority of the stationary screens area;

(e) terminating extraction from the screens in each radial segment approximately when the suspension is being introduced therein; and (f) continuously removing from a top portion of the vessel, above the level of the screens, a portion of the entire radial extent of the suspension at the top of the column preceding the radial segment into which the suspension is being introduced at the bottom of the column.

2. A method as recited in claim 1 comprising the further step of: (g) controlling the ratio of the upward flow of suspension in each of the vertical channels so that the flow in each channel is substantially the same as the flow in the other channels.

3. A method as recited in claim 2 utilizing a material inlet structure, a material removal structure, and a channel flow-ratio control structure, and wherein steps (b), (c), (f), and (g) are accomplished, in part, by rotating the material inlet structure, the treatment fluid inlet structure, the material removal structure, and the channel flow-ratio control structure together, on the same common rotating structure.

4. A method as recited in claim 1 wherein the fluid introducing structures include a plurality of rotating nozzle assemblies, and wherein step (c) is practiced by designing each nozzle assembly so that at any point in the rotation cycle thereof the volume of introduced fluid plus the nozzle assembly volume is a constant.

5. A method as recited in claim 1 wherein the fluid introducing structures comprise a plurality of rotatable nozzle assemblies, and comprising the further step of minimizing the friction between the nozzle assemblies and the suspension by constructing major portions of the nozzle assembly of material having low-friction properties comparable to those of polytetrafluoroethylene, and providing circumferential ribs on the exterior surfaces of the nozzle assembly.

6. A method as recited in claim 1 comprising the further step of minimizing screen resistance to the upward flow of comminuted cellulosic fibrous material in each channel by tapering the screens and providing downwardly angled liquid passages in the screens' surfaces.

7. A method as recited in claim 1 wherein the suspension has a consistency of about 6–14 percent.

* * * * *